US006457044B1

(12) United States Patent
IwaZaki

(10) Patent No.: US 6,457,044 B1
(45) Date of Patent: Sep. 24, 2002

(54) ELECTRONIC-MAIL SYSTEM FOR TRANSMITTING AND RECEIVING IMAGE DATA UTILIZING MANAGEMENT OF COMPATABILITY TRANSMISSION MODES AND CAPABILITY INFORMATION OF DESTINATION TERMINALS

(75) Inventor: Ryuji IwaZaki, Shizuoka-ken (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/292,691

(22) Filed: Apr. 15, 1999

(30) Foreign Application Priority Data

Apr. 21, 1998 (JP) .............................. 10-110593

(51) Int. Cl.[7] .............................................. G06F 15/16
(52) U.S. Cl. ........................ 709/206; 709/209; 709/228; 709/230; 709/232; 709/245
(58) Field of Search ................................ 709/203, 206, 709/209, 228, 230, 232, 245

(56) References Cited

U.S. PATENT DOCUMENTS

| 5,812,770 | A | * | 9/1998 | Sakai .......................... 709/245 |
| 5,862,325 | A | * | 1/1999 | Reed et al. .................. 709/201 |
| 5,881,233 | A | | 3/1999 | Toyoda et al. ............... 709/233 |
| 6,028,679 | A | * | 2/2000 | Murphy ....................... 358/407 |
| 6,088,125 | A | * | 7/2000 | Okada et al. ................ 358/405 |
| 6,124,939 | A | | 9/2000 | Toyoda et al. .............. 358/1.15 |
| 6,147,773 | A | * | 11/2000 | Taylor et al. ................ 358/400 |
| 6,157,954 | A | * | 12/2000 | Moon et al. ................. 709/228 |
| 6,195,686 | B1 | * | 2/2001 | Moon et al. ................. 709/206 |
| 6,229,884 | B1 | * | 5/2001 | Toyoda et al. ......... 379/100.08 |

FOREIGN PATENT DOCUMENTS

| EP | 0 601 860 | 6/1994 |
| EP | 0 835 011 | 4/1998 |
| JP | 8-242326 | 9/1996 |

OTHER PUBLICATIONS

Patent Abstracts of Japan, vol. 1997, No. 01, Jan. 31, 1997 and JP 08–242326 A (Matsushita Electric Ind. Co. Ltd.), Sep. 17, 1996—Abstract Only.

P. Newman, W. Edwards, R. Hinden, E. Hoffman, F. Ching Liaw, G. Mishall: "An Extensible Message Format for Message Disposition Notifications", RFC Specification RFC2298 TXT, Online!, Mar. 1, 1998, XP002156456, Retrieved from the Internet: <URL:http:/www.normos.org/en/lists/ietf/rfc>—retrieved on Jan. 5, 2001!—Entire Document.

"Storage of the Capabilities of Frequently Called Facsimile Machines", IBM Technical Disclosure Bulletin, US, IBM Corp., New York, vol. 32, No. 12, May 1, 1990, p. 34 XP000105064, ISSN: 0018–8669—Entire Document.

\* cited by examiner

Primary Examiner—Zarni Maung
Assistant Examiner—Nabil El-Hady
(74) Attorney, Agent, or Firm—Frishauf, Holtz, Goodman & Chick, P.C.

(57) ABSTRACT

An electronic-mail address and communication condition information associated with the address are stored in an address book in correspondence with each other. If a destination address is registered in the address book, before image transmission, a CPU receives communication condition information corresponding to the destination address through an address book management section and determines the transmission mode to the S or B mode on the basis of the communication condition information. When the transmission mode is the B mode, parameters representing the conditions of the image are determined on the basis of the communication condition information. The CPU transmits the image under the determined conditions.

3 Claims, 8 Drawing Sheets

| ELECTRONIC-MAIL ADDRESS | COMMUNICATION CONDITION | |
|---|---|---|
| | MODE | DIS |
| tanaka@xxxx.co.Jp | S | |
| taro@xyz.co.Jp | B | 200, 300dpi  A4, B4  MH, MR, MMR |
| John@vwxy.com | B | 200dpi  A4  MH |
| ⋮ | ⋮ | ⋮ |
| hanako@rstu.co.Jp | S | |

```
From: aaa@zzzz.co.Jp
To: bbb@xxxx.co.Jp
Date: Tue,1 July 97 12:38:31 JST
Mime-Version: 1.0
Content-Type: text/plain: charset=iso-2022-jp
Subject: Internet FAX
```

FIG. 4

| ITEM | CONTENTS |
|---|---|
| MESSAGE TYPE | CAPABILITY REQUEST<br>CAPABILITY ANSWER<br>FACSIMILE IMAGE TRANSMISSION<br>MESSAGE CONFIRMATION |
| END CODE | RECEPTION SUCCESS<br>RECEPTION FAILURE |
| CAPABILITY | DIS |

FIG. 5

ELECTRONIC-MAIL SYSTEM FOR TRANSMITTING AND RECEIVING IMAGE DATA UTILIZING MANAGEMENT OF COMPATABILITY TRANSMISSION MODES AND CAPABILITY INFORMATION OF DESTINATION TERMINALS

BACKGROUND OF THE INVENTION

The present invention relates to an electronic-mail system for transmitting/receiving an image in an electronic-mail format through a computer network such as the Internet.

A conventional facsimile apparatus transfers image data through a telephone line in accordance with a facsimile procedure defined by the international standards.

In a fee system employed by telephone lines in a public telephone network or the like, the communication enable time per unit charge becomes short depending on the distance. For this reason, the communication charge is imposed heavily as the distance increases.

To reduce the communication fee, a facsimile apparatus for converting image data into the electronic-mail format and transmitting it as electronic mail through the Internet is known, as disclosed in, e.g., U.S. Pat. No. 5,881,233.

In the Internet, clients are not charged for data transfer between providers (Internet connection traders). More specifically, a client is charged for only data transfer between the client and provider independently of the distance to the final data transmission destination. Hence, as the communication distance increases, the cost merit becomes large.

FIG. 10 shows the arrangement of the facsimile apparatus of this prior art.

As shown in FIG. 10, this facsimile apparatus comprises a CPU 1, a ROM 2, a RAM 3, an external storage section 4, a format conversion section 5, a format inversion section 6, a scanner section 7, a panel section 8, a compression/decompression section 9, a LAN control section 10, and a printer section 11.

In this facsimile apparatus, a facsimile document is set on the scanner section 7. In this state, when the electronic-mail address of a transmission destination is input from the panel section 8, and a start button is depressed, the transmission procedure starts. In the transmission procedure, the facsimile document is read by the scanner section 7 to generate image data. The image data is compressed by the compression/decompression section 9. Resultant binary compressed data is temporarily stored in the external storage section 4 such as a hard disk drive.

The format conversion section 5 converts the binary compressed data into character code data comprised of a combination of 7-bit character codes and also adds, to the character code data, a header describing the transmission destination electronic-mail address, transmission source electronic-mail address, data format, and character code conversion scheme, thereby converting the character code data into electronic-mail data having an electronic-mail format. As the electronic-mail format, a format based on, e.g., the MIME (Multipurpose Internet Mail Extensions) as the electronic-mail standard is used.

The LAN control section 10 sends the electronic-mail data obtained by the format conversion section 5 to a computer network such as the Internet using an electronic-mail transfer protocol such as the SMTP (Simple Mail Transfer Protocol).

An electronic-mail server (not shown) for managing electronic mail is connected to the computer network. Upon receiving the electronic-mail data sent in the above way, the electronic-mail server transfers the mail to the transmission destination address described in the header.

The facsimile apparatus periodically issues, to the electronic-mail server, a transfer request for electronic-mail data addressed to the self apparatus using the POP (Post Office Protocol). When electronic-mail data addressed to the self apparatus is present, the electronic-mail data is transferred from the electronic-mail server. The facsimile apparatus receives the electronic-mail data and temporarily stores it in the external storage section 4.

The format inversion section 6 converts the character code data into binary compressed data. The data is expanded by the compression/decompression section 9 to reproduce image data. This image data is temporarily stored in the external storage section 4.

The image data stored in the external storage section 4 is supplied to the printer section 11 to print an image corresponding to the image data.

The conventional facsimile apparatus for transmitting/receiving an image through the computer network uses a scheme of one-sidedly transmitting an image file attached to electronic mail, in which various conditions such as the resolution, image size, and compression scheme are described in advance as permanent conditions, from the transmission side to the reception side. This image transmission mode will be referred to an S mode (first transmission mode).

On the other hand, a general facsimile apparatus for transmitting image data through a telephone line negotiates first to recognize the capability (usable resolution, image size, compression scheme, and the like) of the other party and transmits image data under conditions corresponding to the capability of the other party. In addition, the facsimile apparatus confirms, on the basis of a confirmation signal returned from the other party, whether the image data is normally received.

Use of this scheme, i.e., negotiation and transmission confirmation, even in facsimile apparatuses using electronic mail has also been examined. This image transmission mode will be referred to a B mode (second transmission mode) hereinafter.

In the B mode, first, the image transmission source transmits capability request mail for requesting notification of the capability to the image transmission destination. Upon receiving the capability request mail, the image transmission destination returns capability answer mail attached with capability information (DIS) (Digital Identification Signal) representing the self capability to the image transmission source. The image transmission source appropriately sets conditions for image data to be transmitted on the basis of the capability information attached to the capability answer mail, converts the image in accordance with the conditions, and transmits compressed image data attached to electronic mail. At the image transmission destination, the image is expanded and printed. When processing is ended, confirmation mail representing the end of processing is returned to the image transmission source. Hence, in the B mode, four electronic-mail messages are transferred in one communication cycle.

For an apparatus compatible with both the S and B modes, when the mode of the apparatus at the image transmission destination is unknown, capability request mail is sent from the transmission side to the reception side. If capability answer mail is returned, it is determined that the image transmission destination is in the B mode. If no answer is returned in a predetermined time period, it is determined that the image transmission destination is in the S mode.

When the image transmission destination has an apparatus compatible with the S mode, the time is wasted to wait for the capability answer mail after necessity of image transmission arises and until actual image transmission is started. Hence, instantaneity of communication is lost.

When the image transmission destination has an apparatus compatible with the B mode, the efficiency lowers because mail for capability exchange is transmitted every time.

As described above, conventionally, the mode at the image transmission destination is determined on the basis of the presence/absence of arrival of capability answer mail for capability request mail. For this reason, image transmission cannot be efficiently performed.

BRIEF SUMMARY OF THE INVENTION

It is an object of the present invention to provide an electronic-mail system capable of more quickly starting actual image transmission and efficiently performing image transmission.

According to the present invention, there is provided an electronic-mail system comprising address storage means for storing an electronic-mail address, mode information representing whether the other party apparatus having the electronic-mail address is compatible with the first transmission mode or the second transmission mode, and, when the other party apparatus having the electronic-mail address is compatible with the second transmission mode, capability information representing a capability of the other party terminal, the electronic-mail address, mode information, and capability information being in correspondence with each other; address registration means for registering the electronic-mail address, the mode information, and the capability information in the address storage means; determination means for determining whether an electronic-mail address designated as a transmission destination is stored in the address storage means; decision means for, when the determination means determines that the electronic-mail address designated as a transmission destination is stored in the address storage means, deciding the transmission mode to be used, on the basis of the transmission mode information stored in the address storage means in correspondence with the designated electronic-mail address, and when the transmission mode is decided to the second transmission mode, deciding communication conditions of the image to be transmitted, on the basis of the capability information stored in the address storage means in correspondence with the designated electronic-mail address; and electronic-mail transmission means for transmitting the image, for which the communication conditions are decided by the decision means, in an electronic-mail format through a computer network.

According to the present invention, actual image transmission can be quickly started, and an image can be efficiently transmitted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view showing an example of a header of electronic-mail data;

FIG. 5 is a view showing the format of attached data in image transmission in the B mode;

DETAILED DESCRIPTION OF THE INVENTION

An embodiment of the present invention will be described below with reference to the accompanying drawing.

Figure 1:
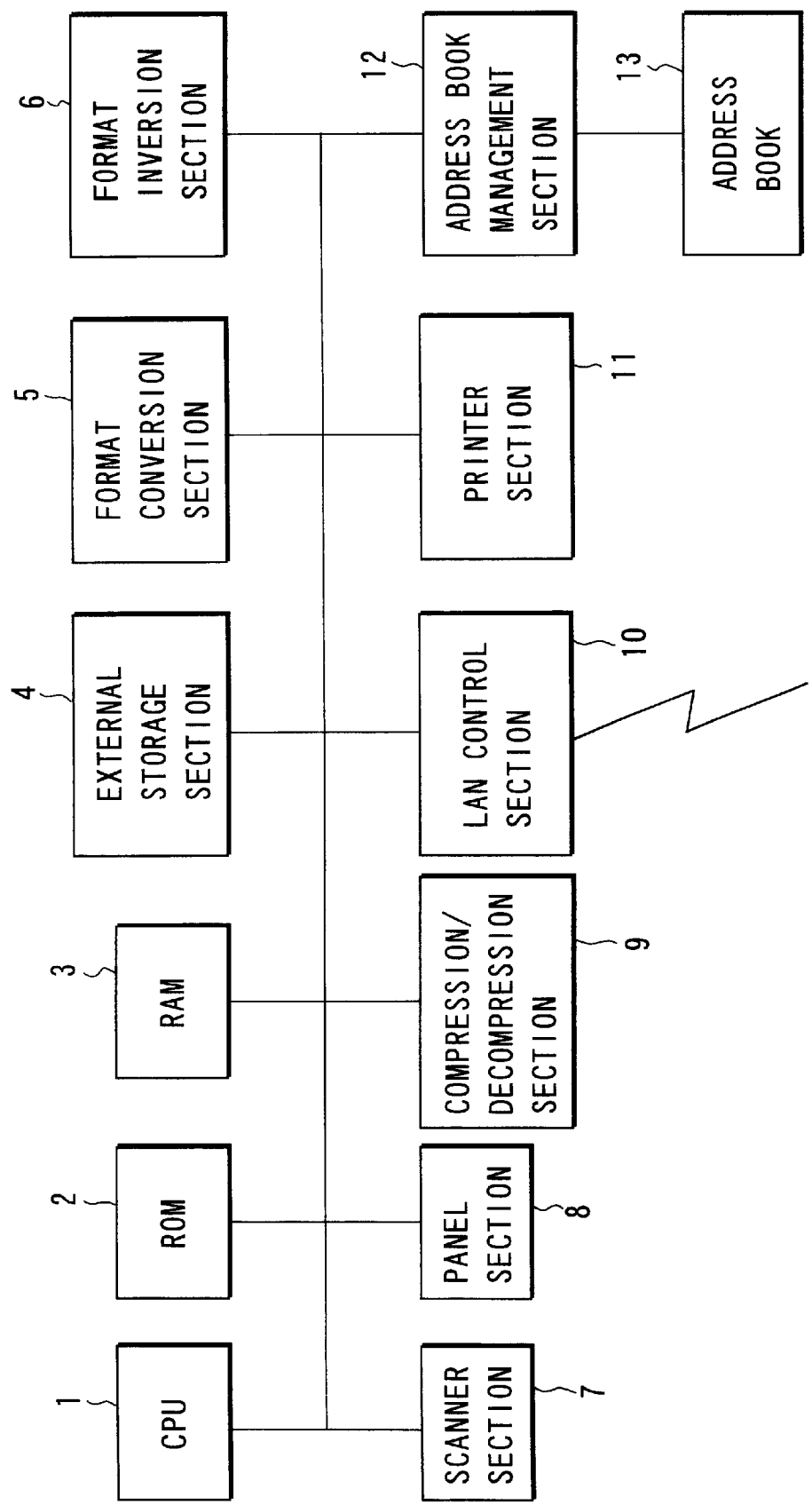
FIG. 1 is a functional block diagram showing the arrangement of a facsimile apparatus to which an electronic-mail system according to an embodiment of the present invention is applied.
Figure 10:
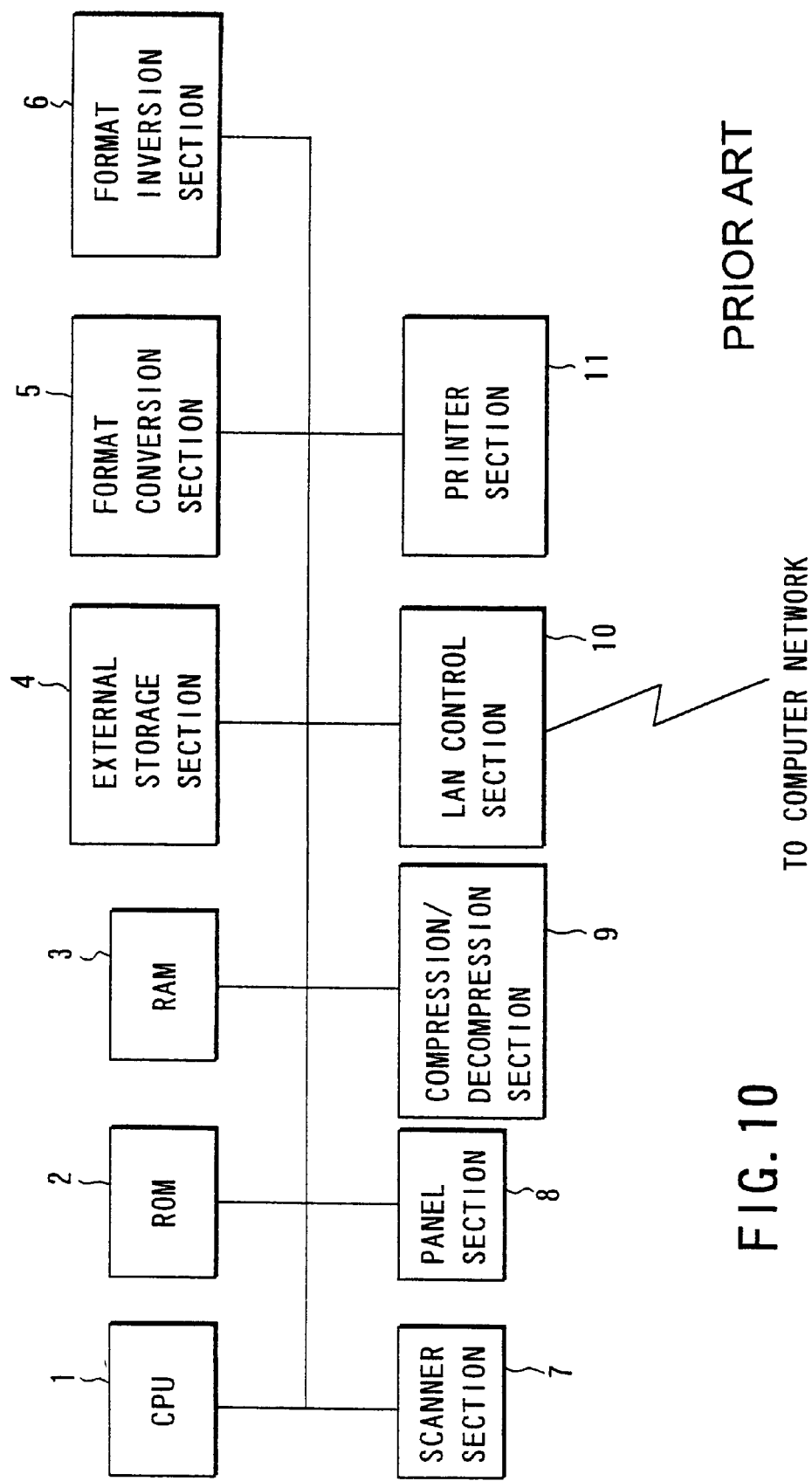
FIG. 10 is a functional block diagram showing the arrangement of a conventional facsimile apparatus.

FIG. 1 is a functional block diagram showing the arrangement of a facsimile apparatus to which an electronic-mail system according to an embodiment of the present invention is applied. The same reference numerals as in FIG. 10 denote the same parts in FIG. 1.

As shown in FIG. 1, the facsimile apparatus of this embodiment comprises a CPU 1, a ROM 2, a RAM 3, an external storage section 4, a format conversion section 5, a format inversion section 6, a scanner section 7, a panel section 8, a compression/decompression section 9, a LAN control section 10, a printer section 11, an address book management section 12, and an address book 13.

The CPU 1 operates on the basis of an operation program stored in the ROM 2 and realizes the operation of the facsimile apparatus by systematically controlling the respective sections of the facsimile apparatus. Functions realized when the CPU 1 operates on the basis of the operation program stored in the ROM 2 include not only known general control means of a conventional facsimile apparatus for transmitting images through a computer network but also a means for performing image transmission processing and capability check processing (to be described later).

The ROM 2 stores the operation program with which the CPU 1 controls the various sections and various predetermined set data.

The RAM 3 temporarily stores various data necessary for the CPU 1 to perform various processing operations.

The external storage section 4 is formed from, e.g., a hard disk drive and stores image data or electronic-mail data.

The format conversion section 5 converts binary compressed data obtained by compressing image data into electronic-mail data having a predetermined electronic-mail format. This electronic-mail data is prepared by adding a header which describes the transmission destination electronic-mail address, transmission source electronic-mail address, data format, and character code conversion scheme to character code data comprised of a combination of 7-bit character codes, which is converted from the binary compressed data.

The format inversion section 6 extracts binary compressed data from electronic-mail data converted from the binary compressed data.

The scanner section 7 reads a facsimile document to generate image data.

The panel section 8 having, e.g., a key/switch group comprises an operation section from which the user inputs various instructions to the facsimile apparatus, and a display section formed from, e.g., a liquid crystal display device on which pieces of information are displayed for the user.

The compression/decompression section 9 compresses image data to obtain binary compressed data. The compression/decompression section 9 also expands binary compressed data to reproduce image data.

The LAN control section 10 performs electronic-mail data transmission/reception processing through a computer network.

The printer section 11 prints an image represented by image data.

The address book management section 12 performs management processing associated with electronic-mail addresses registered in the address book 13 and has functions of performing transmission source address registration processing, transmission destination address search/registration processing, and communication condition information update processing (to be described later).

The address book 13 is formed from a RAM or EEPROM and stores electronic-mail addresses registered in the address book.

Figures 2, 3:
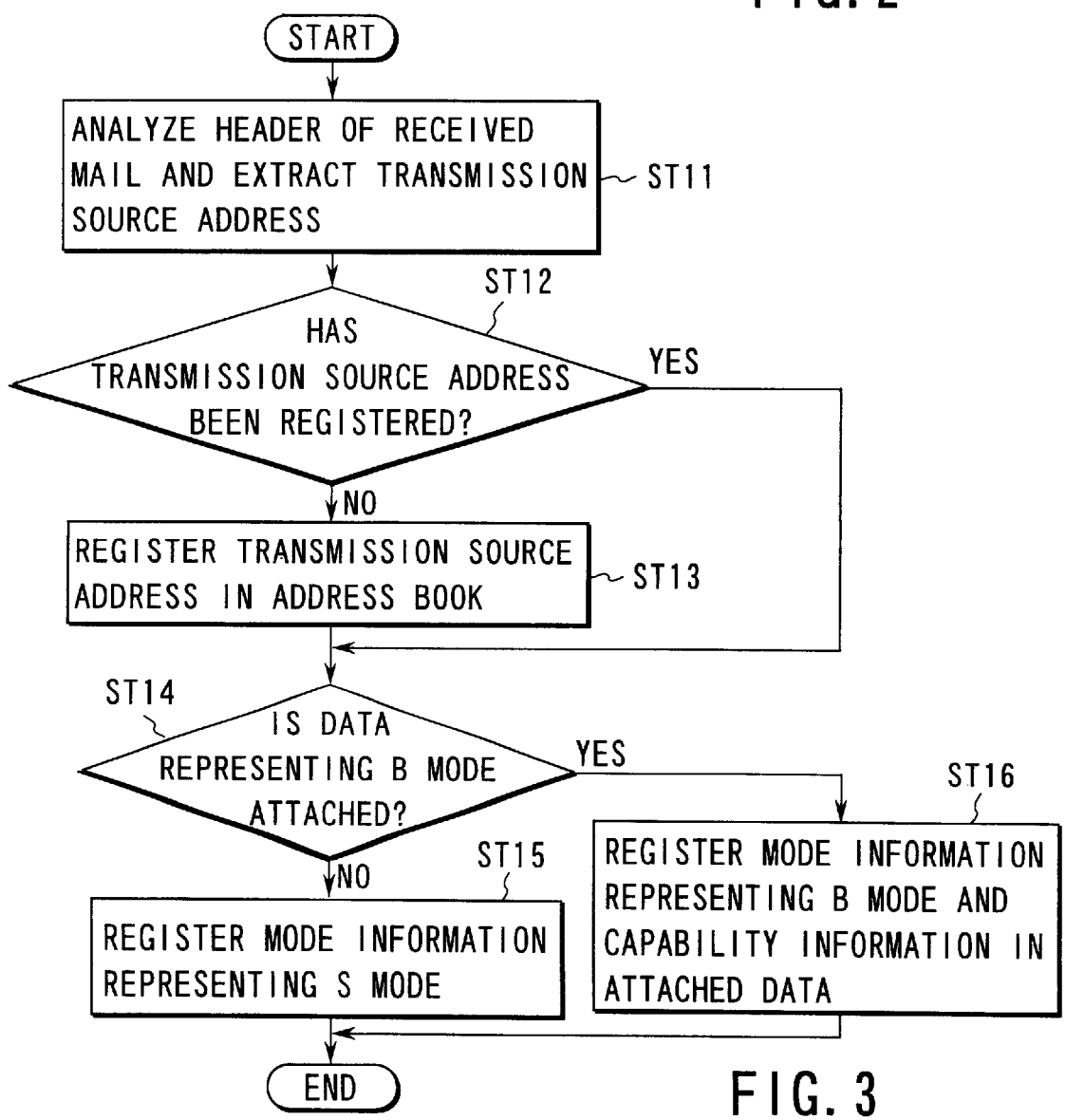
FIG. 2 is a view schematically showing contents of an address book shown in FIG. 1.
FIG. 3 is a flow chart showing the processing procedure of an address book management section in transmission source address registration processing.

FIG. 2 is a view schematically showing contents of the address book 13.

As shown in FIG. 2, communication condition information representing communication conditions for image transmission to electronic-mail addresses can be registered in the address book 13 in correspondence with the respective electronic-mail addresses. Each communication condition information comprises mode information representing a mode to be used for image transmission to the electronic-mail address and, when the mode is B mode, capability information representing the capability of the apparatus having the electronic-mail address. The capability information includes, e.g., the resolution, image size, and compression scheme. The capability information is expressed by an about 80-bits digital identification signal (DIS) defined by T.30 recommendation of the ITU standard as a facsimile transmission procedure.

The operation of the facsimile apparatus with the above arrangement will be described next.

When electronic mail is received, the address book management section 12 executes transmission source address registration processing as shown in FIG. 3.

In transmission source address registration processing, first, the address book management section 12 analyses the header of the received electronic-mail data and extracts the electronic-mail address of the transmission source (to be referred to as a transmission source address hereinafter) (step ST11).

FIG. 4 is a view showing an example of the header. A character string "aaa@zzzz.co.jp" next to "From" represents the electronic-mail address of the transmission source. The header format shown in FIG. 4 is defined as the standard of Internet mail. Hence, the electronic-mail address of the transmission source can always be extracted from any electronic mail.

Subsequently, the address book management section 12 compares the transmission source address extracted in step ST11 with all electronic-mail addresses stored in the address book 13 to check whether the transmission source address is registered in the address book 13 (step ST12).

Only when the transmission source address is not registered in the address book 13, the address book management section 12 registers the transmission source address in the address book 13 (step ST13).

Next, the address book management section 12 checks whether data representing the B mode is added to the received electronic-mail data (step ST14).

When an image is to be transmitted in the B mode, the transmission side attaches data in a format as shown in FIG. 5. Hence, if the data is not attached, the address book management section 12 determines that the apparatus at the transmission source of the received electronic-mail data is compatible with the S mode and registers mode information representing the S mode in the address book 13 in correspondence with the transmission source address registered in step ST13 (step ST15). On the other hand, if the data is attached, the address book management section 12 determines that the apparatus at the transmission source of the received electronic-mail data is compatible with the B mode and registers mode information representing the B mode and capability information, which are contained in the attached data, in the address book 13 in correspondence with the transmission source address registered in step ST13 (step ST16).

When electronic-mail data is received from the other party that communicates for the first time, the electronic-mail address of the other party is registered in the address book 13, and the transmission mode of the other party is registered in correspondence with the electronic-mail address. When the transmission mode of the other party is the B mode, the capability of the other party is registered in correspondence with the electronic-mail address.

When electronic-mail data is received from the other party whose electronic-mail address has already been registered, mode information and capability information which are newly determined from the received data are registered. Hence, even when the mode or capability has changed due to, e.g., replacement of the apparatus of the other party, the registered information is updated to the latest information.

Figure 6:
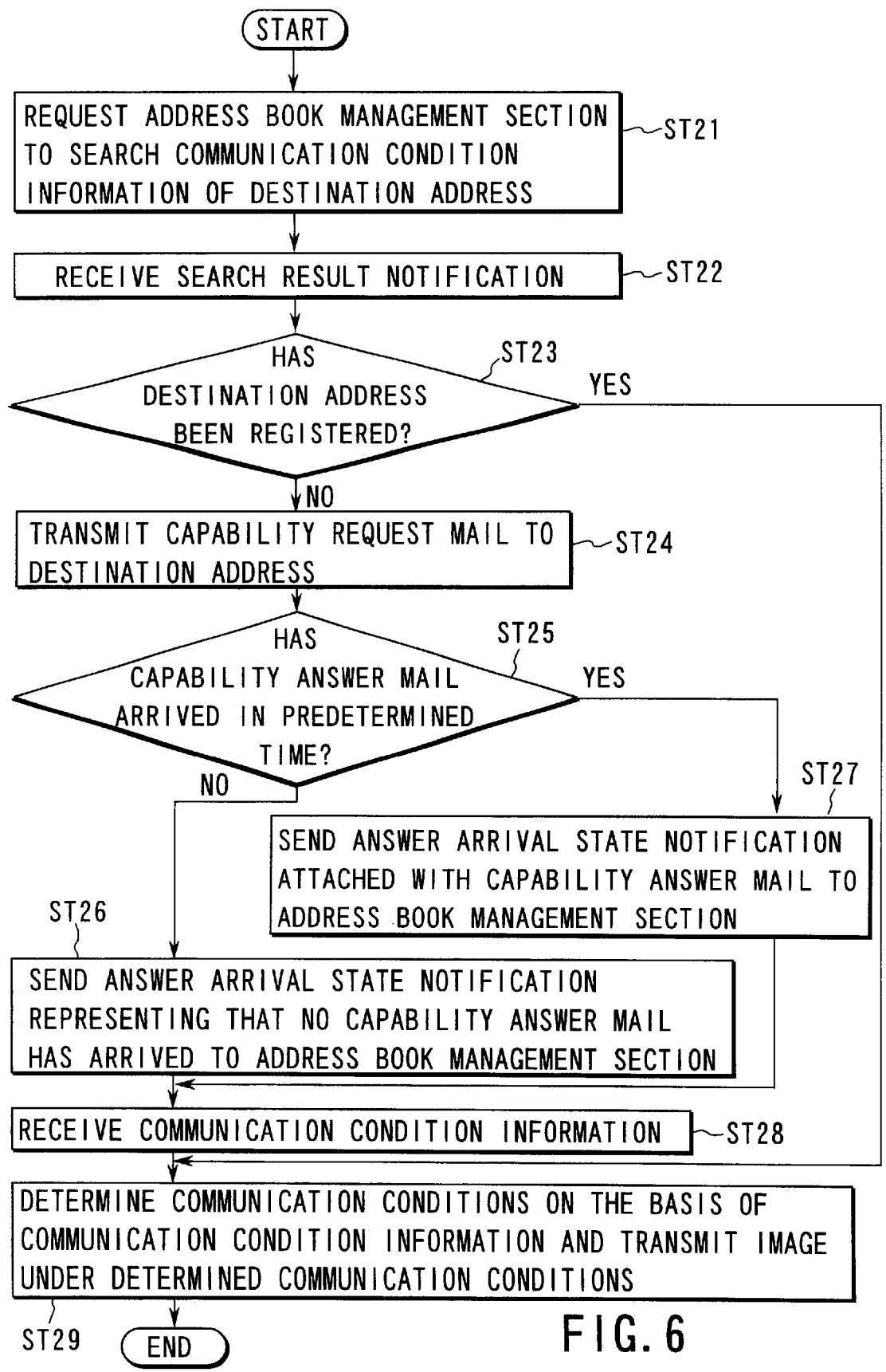
FIG. 6 is a flow chart showing the processing procedure of a CPU in image transmission processing.

When image data need be transmitted, the CPU 1 executes image transmission processing as shown in FIG. 6.

In image transmission processing, first, the CPU 1 requests the address book management section 12 to search transmission condition information for an electronic-mail address designated as a destination (to be referred to as a destination address hereinafter) (step ST21).

Figure 7:
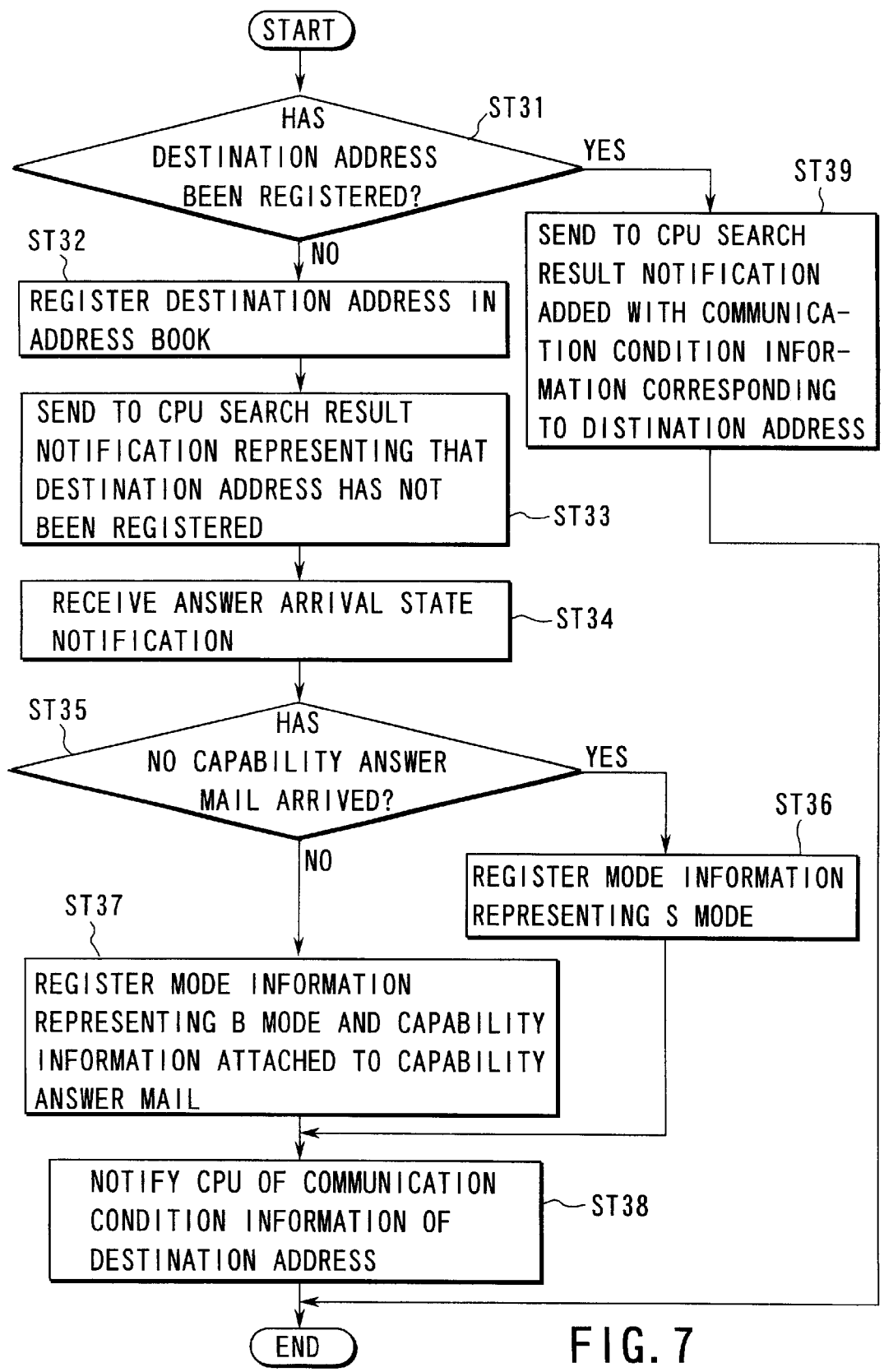
FIG. 7 is a flow chart showing the processing procedure of the address book management section in transmission destination address search/registration processing.

Upon receiving this request, the address book management section 12 executes transmission destination address search/registration processing as shown in FIG. 7.

In transmission destination address search/registration processing, first, the address book management section 12 compares the destination address with all electronic-mail addresses stored in the address book 13 to check whether the destination address is registered in the address book 13 (step ST31).

If the destination address is not registered in the address book 13, the address book management section 12 registers the destination address in the address book 13 (step ST32) and sends a check result notification representing that the destination address has not been registered yet to the CPU 1 (step ST33).

After the check request is issued, the CPU 1 waits for the check result notification from the address book management section 12. When the check result notification is sent, the CPU 1 receives it (step ST22). The CPU 1 determines whether the destination address has already been registered in the address book 13 (step ST23).

When a check result notification representing that the destination address has not been registered is sent, as described above, the CPU 1 generates capability request mail in the B mode and transmits it to the destination address (step ST24). The CPU 1 waits for capability answer mail for this capability request mail for a predetermined time and determines whether the capability answer mail has arrived during this time period (step ST25).

If no capability answer mail has arrived in a predetermined time, an answer arrival state notification representing it is sent to the address book management section 12 (step ST26). If capability answer mail has arrived, an answer arrival state notification added with the capability answer mail is sent to the address book management section 12 (step ST27).

After the CPU 1 is notified of the check result in step ST33, the address book management section 12 waits for the answer arrival state notification from the CPU 1. When the answer arrival state notification is sent, as described above, the address book management section 12 receives it (step ST34). The address book management section 12 recognizes the received answer arrival state notification to determine whether no capability answer mail has arrived (step ST35).

An apparatus compatible with the B mode returns capability answer mail in response to capability request mail. Hence, if no capability answer mail has arrived, the address book management section 12 determines that the apparatus at the destination is compatible with the S mode and registers mode information representing the S mode in the address book 13 in correspondence with the destination address registered in step ST32 (step ST36). On the other hand, if capability answer mail has arrived, the address book management section 12 determines that the apparatus at the destination is compatible with the B mode and registers mode information representing the B mode and capability information, which are contained in the capability answer mail, in the address book 13 in correspondence with the destination address registered in step ST32 (step ST37).

In this way, the electronic-mail address of the other party that communicates for the first time is registered in the address book 13, and the transmission mode of the other party is registered in correspondence with the electronic-mail address. When the transmission mode of the other party is the B mode, the capability of the other party is registered in correspondence with the electronic-mail address.

The address book management section 12 notifies the CPU 1 of the determined communication condition information (step ST38).

After notifying of the answer arrival state in step ST26 or ST27, the CPU 1 waits for communication condition information from the address book management section 12. If communication condition information is sent, the CPU 1 receives it (step ST28). The CPU 1 determines the transmission mode on the basis of mode information contained in the communication condition information, determines various parameters associated with the image to be transmitted, and transmits the image under the determined conditions in accordance with a known procedure (step ST29). When the B mode is set as the transmission mode, parameters such as the number of pixels per line, resolution, and compression scheme are changed on the basis of the capability information. When the S mode is set as the transmission mode, the parameters are permanently set to default values: the number of pixels per line is 1,728, the resolution is 200 dpi, and the compression scheme is the facsimile standard Modified Huffman coding method (MH method).

A case wherein the destination address has not been registered in the address book 13 has been described above. When the destination address has already been registered in the address book 13, the address book management section 12 sends to the CPU 1 a check result notification attached with communication condition information registered in the address book 13 in correspondence with the destination address (step ST39).

In this case, the CPU 1 sets the transmission mode and parameters on the basis of the communication condition information attached to the check result notification, i.e., communication condition information registered in the address book 13 and transmits the image in step ST29.

Communication condition information registered in the address book 13 is updated to latest information when mail is received from a corresponding address, as described above. However, in transmission to an electronic-mail address registered in the address book 13, the transmission mode and parameters are set on the basis of registered communication condition information without confirmation for the other party. Hence, when the mode or capability has changed due to, e.g., replacement of the apparatus of the other party, transmission may be performed on the basis of the old transmission mode and parameters.

Figure 8:
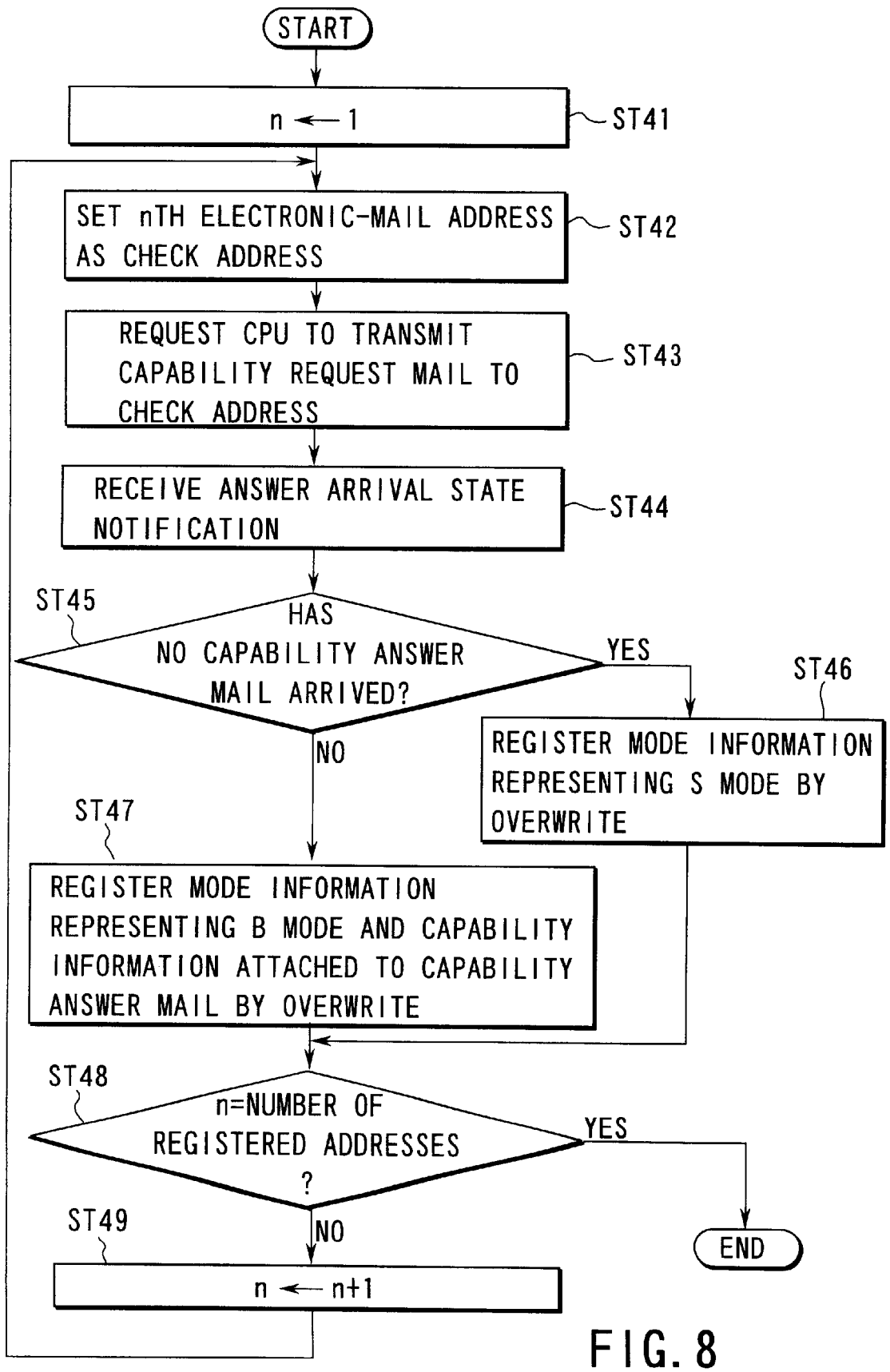
FIG. 8 is a flow chart showing the processing procedure of the address book management section in communication condition information update processing.

To prevent this, the address book management section 12 executes communication condition information update processing as shown in FIG. 8 at a predetermined timing such as once a month.

In communication condition information update processing, first, the address book management section 12 initializes a variable $n$ to "1" (step ST41).

Subsequently, the address book management section 12 sets the nth electronic-mail address registered in the address book 13 as a check address (step ST42) and requests the CPU 1 to transmit capability request mail to this check address (step ST43).

Figure 9:
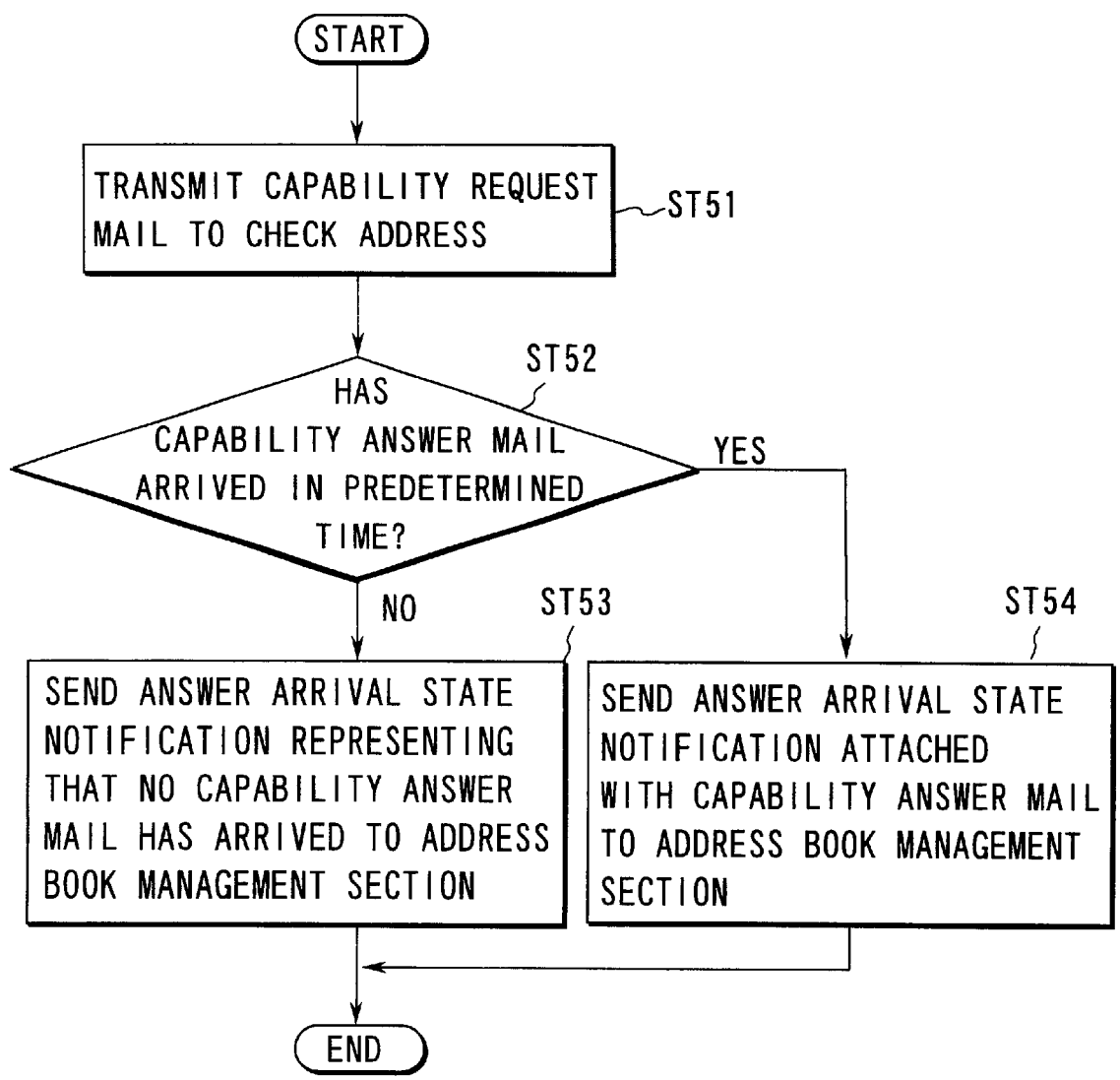
FIG. 9 is a flow chart showing the processing procedure of the CPU in capability check processing.

Upon receiving the capability request mail transmission request from the address book management section 12, the CPU 1 executes capability check processing as shown in FIG. 9.

In capability check processing, first, the CPU 1 generates capability request mail in the B mode and transmits it to the check address (step ST51). The CPU 1 waits for capability answer mail for this capability request mail for a predetermined time and determines whether the capability answer mail has arrived during this time period (step ST52).

If no capability answer mail has arrived in a predetermined time, an answer arrival state notification representing it is sent to the address book management section 12 (step ST53). If capability answer mail has arrived, an answer arrival state notification added with the capability answer mail is sent to the address book management section 12 (step ST54).

After the capability request mail transmission request is issued in step ST43, the address book management section 12 waits for the answer arrival state notification from the CPU 1. When the answer arrival state notification is sent, as described above, the address book management section 12 receives it (step ST44). The address book management section 12 recognizes the received answer arrival state notification to determine whether no capability answer mail has arrived (step ST45).

An apparatus compatible with the B mode returns capability answer mail in response to capability request mail. Hence, if no capability answer mail has arrived, the address book management section 12 determines that the apparatus to be checked is compatible with the S mode and registers mode information representing the S mode in the address book 13 by overwrite in correspondence with the check address (step ST46). On the other hand, if capability answer mail has arrived, the address book management section 12 determines that the apparatus to be checked is compatible with the B mode and registers mode information representing the B mode and capability information, which are contained in the capability answer mail, in the address book 13 by overwrite in correspondence with the check address (step ST47).

Next, the address book management section 12 determines whether the variable $n$ has reached the number of electronic-mail addresses registered in the address book 13 (step ST48). If the variable $n$ is smaller than the number of electronic-mail addresses registered in the address book 13, the address book management section 12 increments the variable $n$ by one (step ST49). After this, processing from step ST42 is repeated. That is, the address book management section 12 sequentially changes the electronic-mail address to be checked and executes processing from step ST42 to step ST47 for each electronic-mail address. If it is determined in step ST48 that the variable n has reached the number of electronic-mail addresses registered in the address book 13, i.e., when processing from step ST42 to step ST47 is executed for all electronic-mail addresses registered in the address book 13, communication condition information update processing is ended.

In this way, when the mode or capability of an apparatus having an electronic-mail address registered in the address book 13 has changed due to, e.g., replacement, the registered information corresponding to the electronic-mail address is updated to the latest information.

As described above, according to this embodiment, an electronic-mail address and communication condition information representing communication conditions for image transmission to the electronic-mail address are registered in the address book 13 in correspondence with each other. For image transmission to an electronic-mail address which has already been registered in the address book 13, the transmission mode and parameters are set on the basis of communication condition information registered in the address book 13 in correspondence with the electronic-mail address.

Hence, when an image is to be transmitted to an electronic-mail address which has already been registered in the address book 13, transmission of capability request mail or arrival monitor or reception of capability answer mail need not be performed, so image transmission can be quickly started.

According to this embodiment, a destination address or transmission source address in communication with the other party that communicates for the first time and communication conditions determined by transmission/reception of capability request mail or capability answer mail during that communication are automatically registered in the address book 13 in correspondence with each other. Hence, for image transmission to the other party that has communicated once, the time until image transmission is properly started can be shortened to increase the efficiency. In addition, since the user need not perform the registration operation, the load on the user does not increase.

According to this embodiment, processing of checking communication conditions associated with electronic-mail addresses registered in the address book 13 to update communication condition information is periodically performed. Hence, even when the mode or capability of an apparatus having an electronic-mail address registered in the address book 13 has changed due to, e.g., replacement, the change is always reflected on the registered communication condition information, and an image can be transmitted under appropriate communication conditions.

The present invention is not limited to the above embodiment. For example, in the above embodiment, the electronic-mail system of the present invention is applied to a facsimile apparatus which exclusively transmits/receives images. However, the practical form is not limited to the facsimile apparatus and can be arbitrary.

In addition, in the above embodiment, in communication condition information update processing, newly obtained communication condition information is unconditionally registered by overwrite. However, newly obtained communication condition information may be compared with already registered communication condition information. Only when the communication condition information has changed, the newly obtained communication condition information is registered by overwrite.

Furthermore, in the above embodiment, electronic-mail addresses are automatically registered in the address book 13. However, electronic-mail addresses may be input by the user and registered in the address book 13.

Various changes and modifications can be made within the spirit and scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic-mail system having, as transmission modes, a first transmission mode for fixing conditions of an image to be transmitted to default conditions and a second transmission mode for changing the conditions of the image to be transmitted in accordance with a capability of a receiving party apparatus, said electronic-mail system comprising:

address storage means for storing, in correspondence with each other, an electronic-mail address, mode information representing whether the receiving party apparatus is compatible with the first transmission mode or the second transmission mode, and, when the receiving party apparatus is compatible with the second transmission mode, capability information representing a capability of the receiving party apparatus;

address registration means for registering the electronic-mail address, the mode information, and the capability information in said address storage means;

determination means for determining whether an electronic-mail address designated as a transmission destination is stored in said address storage means;

decision means for, when said determination means determines that the electronic-mail address designated as the transmission destination is stored in said address storage means, deciding the transmission mode to be used, based on the transmission mode information stored in said address storage means in correspondence with the designated electronic-mail address, and when the transmission mode is decided to be the second transmission mode, deciding communication conditions of the image to be transmitted, based on the capability information stored in said address storage means in correspondence with the designated electronic-mail address; and electronic-mail transmission means for transmitting the image, for which the communication conditions are decided by said decision means, in an electronic-mail format through a computer network;

wherein when said determination means determines that the electronic mail address designated as the transmission destination is not stored in said address storage means, said address registration means transmits predetermined electronic mail for requesting a capability notification, determines the transmission mode based on a presence/absence of answer mail, stores the determined transmission mode in said address storage means in correspondence with the designated electronic-mail address, and stores capability information contained in the answer mail in said address storage means in correspondence with the designated electronic-mail address.

2. An electronic-mail system having, as transmission modes, a first transmission mode for fixing conditions of an image to be transmitted to default conditions and a second transmission mode for changing the conditions of the image to be transmitted in accordance with a capability of a receiving party apparatus, said electronic-mail system comprising:

address storage means for storing, in correspondence with each other, an electronic-mail address, mode information representing whether the receiving party apparatus is compatible with the first transmission mode or the second transmission mode, and, when the receiving party apparatus is compatible with the second transmission mode, capability information representing a capability of the receiving party apparatus;

address registration means for registering the electronic-mail address, the mode information, and the capability information in said address storage means;

determination means for determining whether an electronic-mail address designated as a transmission destination is stored in said address storage means;

decision means for, when said determination means determines that the electronic-mail address designated as the transmission destination is stored in said address storage means, deciding the transmission mode to be used, based on the transmission mode information stored in said address storage means in correspondence with the designated electronic-mail address, and when the transmission mode is decided to be the second transmission mode, deciding communication conditions of the image to be transmitted, based on the capability information stored in said address storage means in correspondence with the designated electronic-mail address;

electronic-mail transmission means for transmitting the image, for which the communication conditions are decided by said decision means, in an electronic-mail format through a computer network; and update means for transmitting predetermined electronic mail for requesting a capability notification to at least one electronic-mail address stored in said address storage means at a predetermined timing, and based on a presence/absence of answer mail and contents of the answer mail, updating at least the mode information stored in said address storage means;

wherein when said determination means determines that the electronic-mail address designated as the transmission destination is not stored in said address storage means, said address registration means transmits the electronic mail for requesting the capability notification, determines the transmission mode based on a presence/absence of answer mail, stores the determined transmission mode in said address storage means in correspondence with the designated electronic-mail address, and stores capability information contained in the answer mail in said address storage means in correspondence with the designated electronic-mail address.

3. An electronic-mail system having, as transmission modes, a first transmission mode for fixing conditions of an image to be transmitted to default conditions and a second transmission mode for changing the conditions of the image to be transmitted in accordance with a capability of a receiving party apparatus, said electronic-mail system comprising:

address storage means for storing, in correspondence with each other, an electronic-mail address, mode information representing whether the receiving party apparatus is compatible with the first transmission mode or the second transmission mode, and, when the receiving party apparatus is compatible with the second transmission mode, capability information representing a capability of the receiving party apparatus;

address registration means for registering the electronic-mail address, the mode information, and the capability information in said address storage means;

determination means for determining whether an electronic-mail address designated as a transmission destination is stored in said address storage means;

decision means for, when said determination means determines that the electronic-mail address designated as the transmission destination is stored in said address storage means, deciding the transmission mode to be used, based on the transmission mode information stored in said address storage means in correspondence with the designated electronic-mail address, and when the transmission mode is decided to be the second transmission mode, deciding communication conditions of the image to be transmitted, based on the capability information stored in said address storage means in correspondence with the designated electronic-mail address;

electronic-mail transmission means for transmitting the image, for which the communication conditions are decided by said decision means, in an electronic-mail format through a computer network; and reception means for receiving electronic mail; wherein when said determination means determines that the electronic mail address designated as the transmission destination is not stored in said address storage means, said address registration means transmits predetermined electronic mail for requesting a capability notification, determines the transmission mode based on a presence/absence of answer mail, stores the determined transmission mode in said address storage means in correspondence with the designated electronic-mail address, and stores capability information contained in the answer mail in said address storage means in correspondence with the designated electronic-mail address; and wherein said address registration means extracts an electronic-mail address of a transmission source described in the received mail, stores the extracted electronic-mail address in said address storage means in correspondence with mode information representing a mode used in reception of the received electronic mail, and when capability information associated with the transmission source is contained in the received electronic mail, stores the capability information in said address storage means in correspondence with the extracted electronic-mail address.

\* \* \* \* \*